United States Patent [19]
Winokur et al.

[11] Patent Number: 5,483,637
[45] Date of Patent: Jan. 9, 1996

[54] EXPERT BASED SYSTEM AND METHOD FOR MANAGING ERROR EVENTS IN A LOCAL AREA NETWORK

[75] Inventors: Alex Winokur, Haifa; Joseph Shiloach, Kirat Tiv'on; Amnon Ribak, Misgav, all of Israel; Yuangene Huang, Austin, Tex.

[73] Assignee: International Business Machines Corporation, Armonk, N.Y.

[21] Appl. No.: 266,074

[22] Filed: Jun. 27, 1994

[51] Int. Cl.⁶ .............................. G06F 11/00; G06F 15/18
[52] U.S. Cl. .................. 395/183.02; 395/183.22
[58] Field of Search .................................. 395/575, 550, 395/183.02, 183.22, 911, 917; 364/550, 264.7, 269.4; 371/20.1

[56] References Cited

U.S. PATENT DOCUMENTS

| | | | |
|---|---|---|---|
| 4,803,641 | 2/1989 | Hardy et al. | 364/513 |
| 4,817,092 | 3/1989 | Denny | 371/11 |
| 4,866,635 | 9/1989 | Kahn et al. | 364/513 |
| 4,881,230 | 11/1989 | Clark et al. | 371/20.1 |
| 4,999,833 | 3/1991 | Lee | 370/94.1 |
| 5,047,977 | 9/1991 | Hill et al. | 364/900 |
| 5,097,469 | 3/1992 | Douglas | 371/20.1 |
| 5,157,667 | 10/1992 | Carusone, Jr. et al. | 371/29.1 |
| 5,159,685 | 10/1992 | Kung | 395/183.02 |
| 5,309,448 | 5/1994 | Bouloutas et al. | 371/29.1 |
| 5,365,514 | 11/1994 | Hershey et al. | 370/17 |
| 5,375,070 | 12/1994 | Hershey et al. | 364/550 |
| 5,377,196 | 12/1994 | Godlew et al. | 371/20.1 |
| 5,388,189 | 2/1995 | Kung | 395/50 |

OTHER PUBLICATIONS

Hitson, Knowledge-Based Monitoring and Control: An Approach to Understanding the Behavior or TCP/IP Network Protocols, ACM SIGCOMM '88 (Aug.), at 210–221.

Rabie et al., DAD: A Real-Time Expert System for Monitoring of Data Packet Networks, IEEE Network, vol. 2, Sep. 1988, at 29–34.

Feridun et al., ANM: Automated Network Management System, IEEE Network, vol. 2, No. 2, Mar. 1988.

Patel et al., Integrating Network Management and Artificial Intelligence, in Integrated Network Management I, (Meandzija & Wescott eds.) 1989, at 647.

Goodman et al., Real Time Autonomous Expert Systems in Network Management, in Integrated Network Management I, (Meandzija & Wescott eds.) 1989, at 599.

Godlew, An Automated Approach to Network Fault Identification, 6th World Telecommunications Forum, Oct. 1991, at 97.

(List continued on next page.)

*Primary Examiner*—Robert W. Beausoliel, Jr.
*Assistant Examiner*—Alan M. Fisch
*Attorney, Agent, or Firm*—Whitham, Curtis, Whisham & McGinn; Jeffrey LaBaw

[57] ABSTRACT

An expert based system for managing error events in a local area network (LAN) includes an inference engine and a knowledge base storing data defining a plurality of causal relationships. Each of the causal relationships associates an error message with a cause, at least one implied relationship, and at least one trigger relationship. The inference engine accesses said knowledge base in response to a receiver error message to identify the error message and retrieve from the knowledge base its possible causes. The received error message is compared with other already received error messages to filter out repeated error messages. Already received error messages are examined to determine whether a triggering error message has arrived and, if so, the received error is discarded. The received error message is compared with existing diagnostic problems, termed a cluster, to determine if the received error message shares common causes with all error messages in the cluster and, if so, the received error message is added to the cluster. The causes in a cluster are evaluated to determine whether one cause in a cluster implies another cause and, if so, the implied cause is discarded. A user interface connected to the inference engine is used for reporting problems including correlated error messages, a cause and a recommended action for fixing the cause.

13 Claims, 4 Drawing Sheets

LAN EXPERT Server

OTHER PUBLICATIONS

Hitson, Knowledge-Based Monitoring and Control of Distributed Systems, Computer Systems Laboratory (technical report CSL-TP-90-414), Feb. 1990.

Yamahira et al., Network Troubleshooting Expert System EXNETS, NEC Research & Development, Jul. 1989, at 120.

Zinky et al., An Automatic Network Troubleshooter for Throughput Bottlenecks in Computer Networks, Annual AI Systems in Gov't. Conference, Mar. 1989, at 296.

"Correlation of Failure Notifications", IBM Technical Disclosure Bulletin, V37 N01, Jan. 1994, pp. 659–661.

"IPDS Nack Recovery in an Enhanced Expert System Framework", IBM Technical Disclosure Bulletin V36 N10, Oct. 1993, pp. 79–83.

EXPERT BASED SYSTEM AND METHOD FOR MANAGING ERROR EVENTS IN A LOCAL AREA NETWORK

This application is related to co-pending application Ser. No. 08/266,073, filed on Jun. 27, 1994, which is herein incorporated by reference.

DESCRIPTION

BACKGROUND OF THE INVENTION

1. Field of the Invention

The present invention generally relates to a causal model for problem determination and a method of capturing the relationship between causes and error messages for local area network (LAN) systems to be managed and analyzed and, more particularly, to a causal model which represents problem solving knowledge and represents relationships between causes and error messages using a limited multi fault approach. The causal model can be used by an inference engine in an expert system for diagnostic reasoning and analysis and correlation of error messages.

2. Description of the Prior Art

It is common for computer systems, in particular local area networks (LANs), to have numerous error events, the majority of which require different messages to be sent to the user and the occurrence and performance of many different complex actions for recovery. These errors result from a variety of conditions, including configuration errors, hardware errors and communication errors.

At present, error analysis and problem resolution is often handled manually by LAN administrators. There are two problems with this approach. The first is that the error messages often contain vague or incomplete information. An example of this would be the error message "internal software error". The administrator must then decipher the error message or perform additional work to determine the actual cause of the error. The second problem with manual error code resolution is that one problem can often generate multiple error messages, especially in a LAN system. Therefore, the LAN administrator is often overwhelmed by the number of errors that need to be analyzed. Furthermore, the analysis and review of errors is knowledge intensive. Therefore, it has been difficult to implement a non manual method or system for managing error messages.

Some attempts have been made in the past to implement an error manager; however, these have been unsuccessful due to the large amount of information which must be stored and the knowledge required. In some cases, error managers have been implemented with complicated in-line code which is called after an error event is recognized. Other implementations have used "table driven" error management. However, since each error event can have many action codes and each unique error event/action code pair must be represented, this system was inefficient in representation and storage. Furthermore, none of these methods provide a system which enables users to modify the error handling method.

Error management requires problems and causes to be correlated so that information regarding the error can be analyzed and provided. At present, most problem determination systems use the single fault assumption wherein only a single fault can exist in a system at one time and that fault is associated with a single cause. The single fault assumption could be used with a complex network system or computer system. Other complex systems use the multi fault assumption, however, this is computationally too expensive for a real time system. Therefore, it could not provide error information in real time.

SUMMARY OF THE INVENTION

It is therefore an object of the present invention to provide a method of correlating problems and causes according to a limited multi fault assumption.

It is another object of the present invention to provide a method and system for representing the relationship between error messages and actual causes.

It is also an object of the present invention to correlate error events or messages and causes in real time.

According to the invention, a method and system for representing the relationship between error events or messages and actual causes in real time in a computer system, and particularly in a local area network system are provided. In particular, a method and system are provided for a casual model for the analysis and correlation of error messages and possible causes. In addition, a method of associating problems with error messages is provided. The method recognizes multiple faults on a system, i.e. a server or requester and these faults can be associated with different error messages.

The method for representing the relationship between errors and causes provided by the present invention utilizes a series of links including cause, imply or trigger which define the relationships between messages and causes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
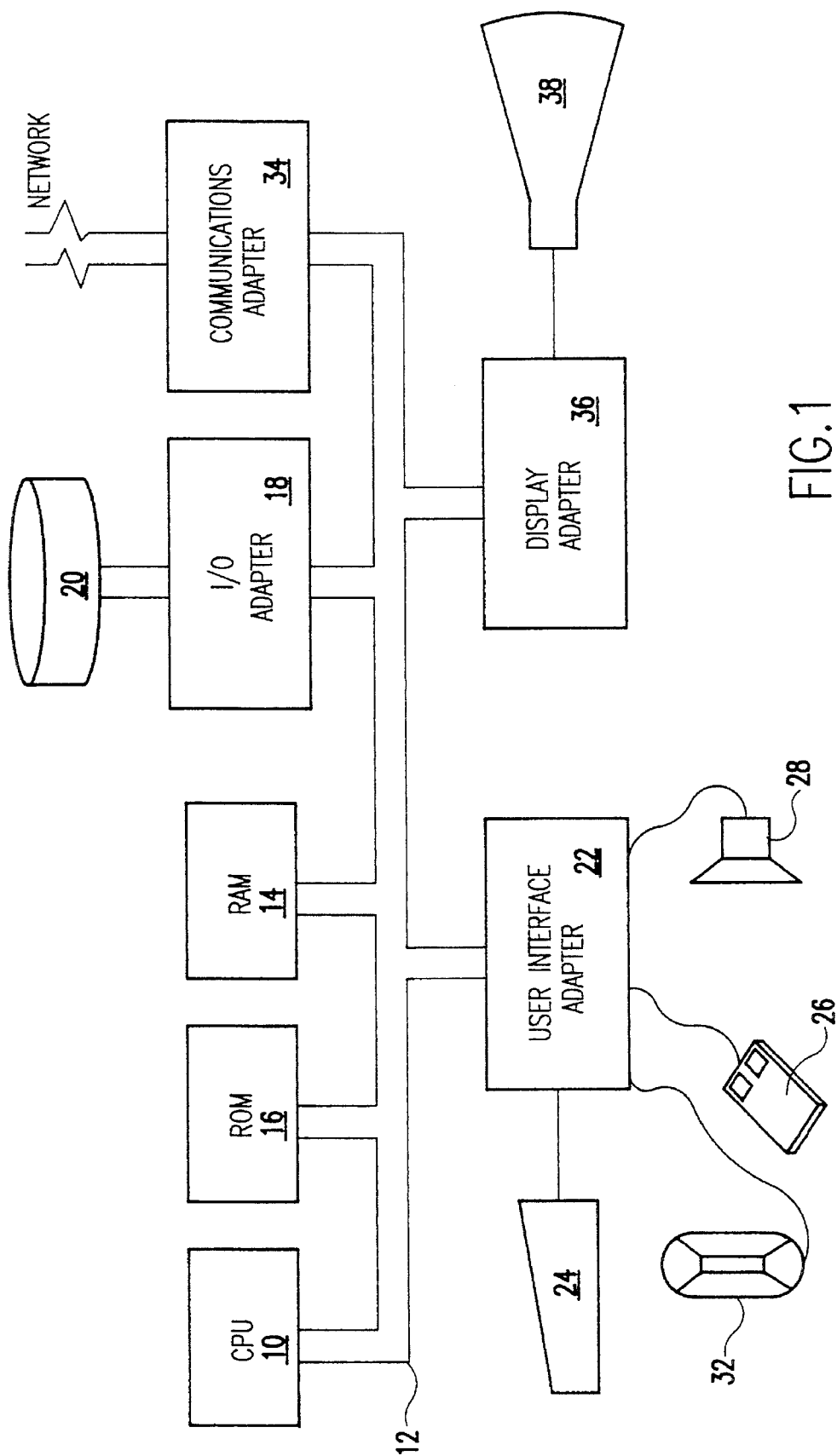
FIG. 1 is a block diagram showing a hardware configuration on which the subject invention may be implemented.

Referring now to the drawings, and more particularly to FIG. 1, there is shown a representative hardware environment which can be used as a server or requester in a LAN system and on which the subject invention may be implemented. This hardware environment may be a personal computer such as the International Business Machines (IBM) Corporation's PS/2 Personal Computers or a workstation such as IBM's RS/6000 Workstations. The hardware includes a central processing unit (CPU) 10, which may be a complex instruction set computer (CISC) microprocessor such as the Intel 386, 486 or Pentium microprocessors or a reduced instruction set computer (RISC) microprocessor such as IBM's PowerPC microprocessor. The CPU 10 is attached to a system bus 12 to which are attached a random access memory (RAM) 14, a read only memory (ROM) 16, an input/output (I/O) adapter 18, and a user interface adapter 22. the RAM 14 provides temporary storage for application program code and data, while ROM 16 typically includes the basic input/output system (BIOS) code. the I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The I/O adapter 18 may support, for example, the Integrated Device Electronics (IDE) interface standard or the Small Computer System Interface (SCSI) standard. In the former case, the I/O adapter 18 typically will support two disk drives in parallel, designated as drives "C:" and "D:". In the latter case, the I/O adapter 18 will support up to nine disk drives connected in a daisy chain. The user interface adapter 22 has attached to it a keyboard 24, a mouse 26, a speaker 28, a microphone 32, and/or other user interface devices such as a touch screen device (not shown). Such touch screen device would optionally be installed on the display 38, here represented as a cathode ray tube (CRT) display but which may be a liquid crystal display (LCD). The display 38 is connected to the system bus 12 via a display adapter 34. A communications adapter 34 is connected to the bus 12 and to a local network (LAN), such as IBM's Token Ring LAN.

Figure 2:
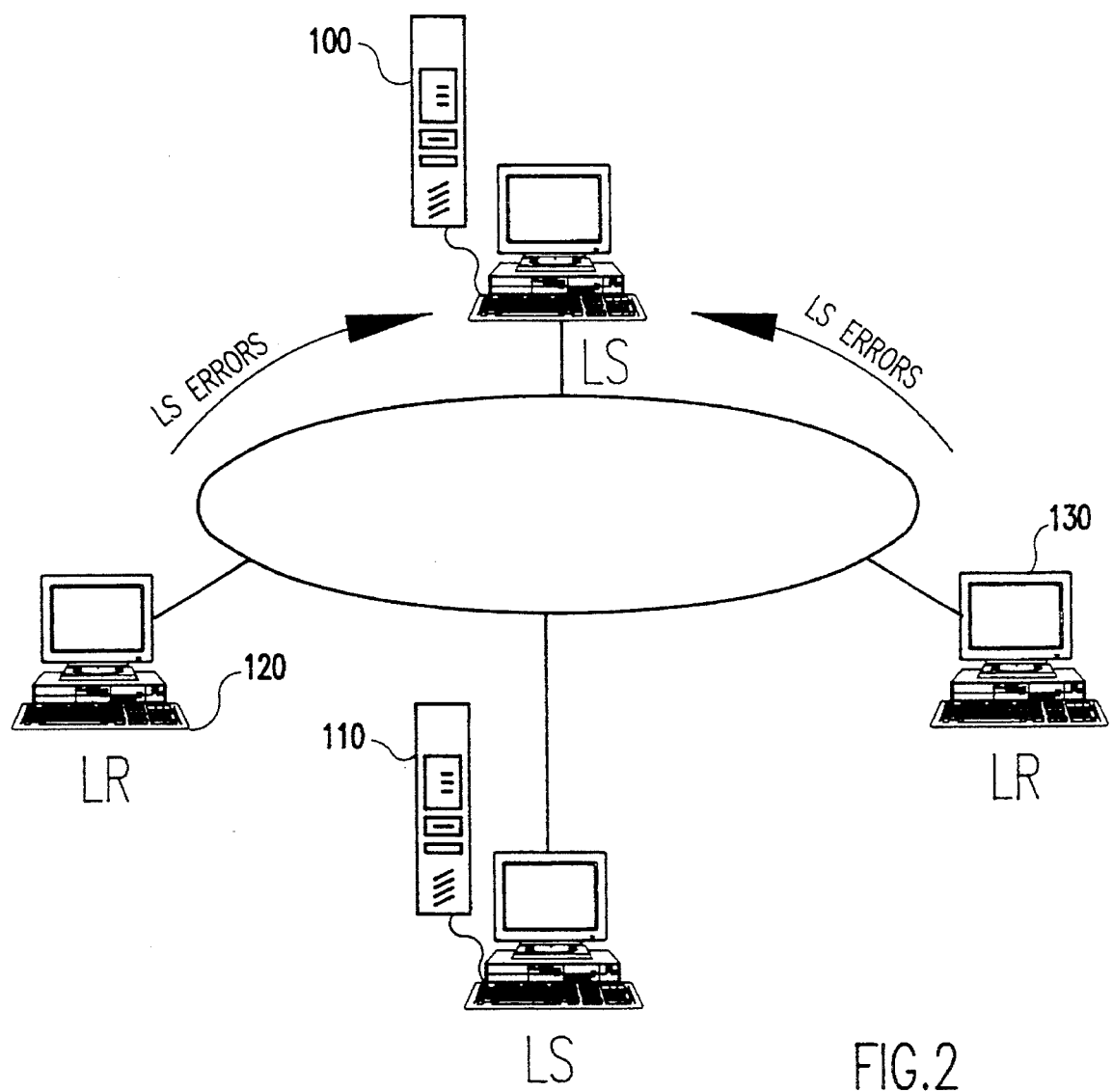
FIG. 2 is a diagram showing an example of a local area network system.

As shown in FIG, 2, a local area network is a system in which personal computers and other computer devices are configured so that resources can be shared and data and information can be internally transferred. As can be seen, a LAN typically includes at least one server 100, 110 and often more than one requester 120, 130. The servers are devices which provide an interface between peripherals and the network. There are many types of servers including data, print, communication, mirror and gateways. As shown in FIG. 2 LAN EXPERT is a problem determination system for a LAN. Lan EXPERT consists of a LAN EXPERT server 100 and LAN EXPERT agents 110, 120, 130. The agents are installed on LAN servers and requesters to monitor their status. When LAN servers and requesters issue error messages, the LAN EXPERT agents receive them and send them to the LAN EXPERT server. The requesters 120 and 130 are LAN expert agents. The LAN EXPERT server receives the error messages from the LAN EXPERT agents. The LAN EXPERT server includes the inference engine, knowledge base, and other components, such as a knowledge base editor and graphical user interface. These are described in detail below and perform the analysis and correlation of error messages and report problems to the users.

As discussed supra, communication and data transmission between a server and other servers or peripheral devices often results in error events. The event correlation and problem determination system is a method for use in a LAN system for diagnosing problems. It uses an expert system model and is preferably implemented using artificial intelligence technology. It is understood that an expert system is a system that process information and performs functions in manner similar to a human who is an expert in the field. An expert system draws inferences based on the information contained in a knowledge base. A knowledge base, in general, is a data base that contains information about human experience relating to a particular application and data from previously solved problems. An inference engine is also a component of an expert system and is used to apply the principles of reasoning to draw conclusions from the information stored in the knowledge base.

Figure 3:
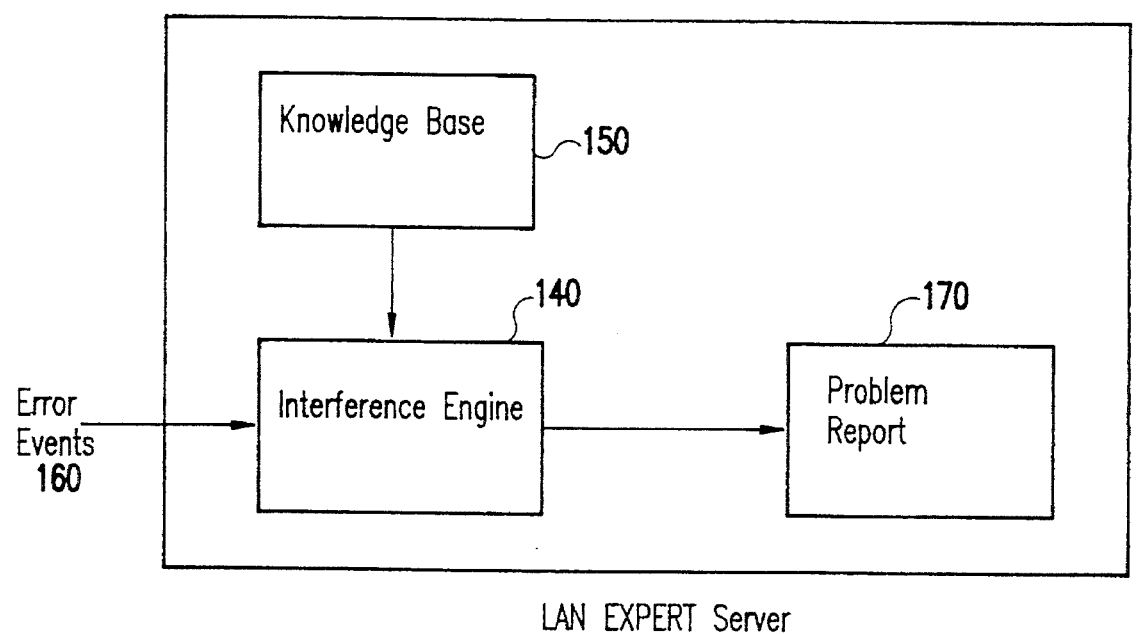
FIG. 3 is an high level overview of the error management system as implemented for a LAN system.

As shown in FIG. 3, the event correlation and problem determination system consists of an inference engine 140 and a knowledge base 150 to process and evaluate error events 160. The knowledge base contains causal relationships between error messages and possible causes. A user can modify and expand the knowledge base with a knowledge base editor. The relationships in the knowledge base are read by the inference engine and this information is used to process incoming error events and diagnose the possible causes. After the information is processed by the inference engine, a problem report is generated 170. This is set forth in more detail below.

A causal model generally consists of three entities: error messages, causes, recommended actions. In addition, it contains the relationships among the three entities. A causal model is used in the knowledge base to capture and represent the relationship between error messages and actual causes. The model is used by the inference engine for diagnostic reasoning in real time to analyze and correlate error messages and purpose possible causes.

As used in regard to this invention, an event is a notification sent by a device, for example a server, database manager or communications manager to the inference engine. An event consists of at least three entities, an error message, a reporting machine and an event creation time. Other entities can be included where necessary.

An error message, as noted above, is a part of an event and is issued by a device, for example a LAN server or requester, when a problem is encountered. The agents of the device, in particular a LAN EXPERT, receive the error message and send them to the LAN EXPERT server. In general, an error message has an alphanumeric identification and a text section which is a brief description of the problem. The text section may also include variables that are given values at run-time. A message which has variables with actual values is called an instantiated message. A non-instantiated messed is termed generic.

A cause, in terms of the present invention, is the underlying reason why something did not work and is the part of the system that has to be fixed. A cause consists of a verbal description which can include variables. For example, a typical cause might be: File X is corrupted. The identity of the corrupted file is determined at run time. A cause can be either generic or instantiated. In addition, a cause does not contain any information about the location of the problem. Therefore, a located cause is one which has a cause paired with a machine.

Finally, a problem report contains information from the inference engine's diagnosis including a cause or causes, a set of events that are related to the cause or causes and the recommended actions to fix the problem.

The causal model of the present invention is used to represent in the knowledge base a variety of relationships which can exist between error messages and causes and these are used by the inference engine to correlate events with causes. One possible relationship is a cause relationship which represents that a particular error message possibly results from a particular cause. In other words, a cause C causes error message E which can be represented as (C *cause* E). In most instances, for a given cause C, several error messages are generated. This relationship also contains a mapping between message variables and cause variable which enables the instantiation of cause variable in run-time as soon as the message variables are instantiated. The variables are instantiated when they contain actual values.

It is also possible for a relationship to exist between two causes. A cause C1 can imply cause C2 if C1 is more specific than C2. This relationship is represented as (C1 *imply* C2). For example if C1 states "the limit for variable X in file Y has been exceeded" and C2 states "the limit for variable X in file Y is about to be exceeded" then it can be said that (C1 *imply* C2). This relationship is useful because if C1 implies C2, then usually C2 can be disregarded and processing can proceed with C1.

A relationship can also exist between two error messages, wherein one error message E1 can be said to trigger a second error message E2. This relationship is used if E1 and E2 can be caused by the same cause and if E1 is closer to the problem than E2. The use of the term closer is intended to mean that the module which issued E1 might be called, directly or indirectly, by the module which issued E2. Therefore, E1 usually will give more specific causes than E2. So, if two error messages E1 and E2 are issued within a very short period of time and E1 triggers E2, then E2 can usually be disregarded and processing can proceed with E1. However, E2 will join the set of events that is reported with the problem.

These relationships are used to link causes or error messages. Using a graphical representation, each cause or error message is a node and the relationships, cause, imply or trigger are the links between the nodes. The imply and trigger links can be used to form two hierarchies among causes and error message nodes, respectively. The causal links connect the nodes between the two hierarchies. One important property of the imply hierarchy is that a cause node can inherit causal links from its more general ancestor nodes. For example, suppose C1 is a cause of E1, C2 is a cause of both E2 and E3 and C2 implies C1. Therefore, by inheritance, C2 is also a cause of E1. The same inheritance property does not apply to trigger hierarchy, since even though one error message E1 might trigger another error message E2, it does not mean that E2 is always triggered by E1.

In addition to the relationships described supra there is other information which must be taken into consideration. First, it is necessary to consider the location of the cause. In some cases, the reporting node will not be faulty node and therefore it is necessary to determine where the faulty node is. Therefore, a place parameter needs to be associated with the cause relationship to specify the location of the cause. An example of this is if a requestor issues a message that some service is not available; however, the cause may be that the server is down. In this case, the reporting node is the requester, but the faulty node is the server.

A second consideration is the condition of the causal relation since in certain instances a cause C1 causes an error E1 only if a second error message E2 is received at approximately the same time. In other words, certain messages to cause associations are true only if the message at hand is accompanied by other messages which appear at approximately the same time. Otherwise, C1 can not be the cause of E1. Therefore, it is necessary to have the condition parameter associated with the cause, imply and trigger relationships.

It is also necessary to take into consideration the amount of time which should lapse for a triggering relationship. An error message E1 can be considered as a triggering error message of another error message E2 only if E1 and E2 arrive within a set time limit. The time limit exists for all triggering relationships and is user definable.

Another consideration is the insertion variable which are associated with error messages. Therefore, causes must also have corresponding variables. This enables an error message with specific variables to be correlated with a cause with corresponding variables. Corresponding variables should also be specified for the trigger, imply and condition relationships.

A final consideration is a cause and action relationship, so that for a particular cause with certain variables there are corresponding recommended actions.

It is contemplated that a causal model editor can be used to enable a user to input the relationships between the causes, error message and actions. These relationships, as described above, are located in the knowledge base and are used by the inference engine to analyze and correlate error messages and give possible causes and recommended actions. The cause of the causal model by the inference engine for problem determination is set forth below.

Figure 4:
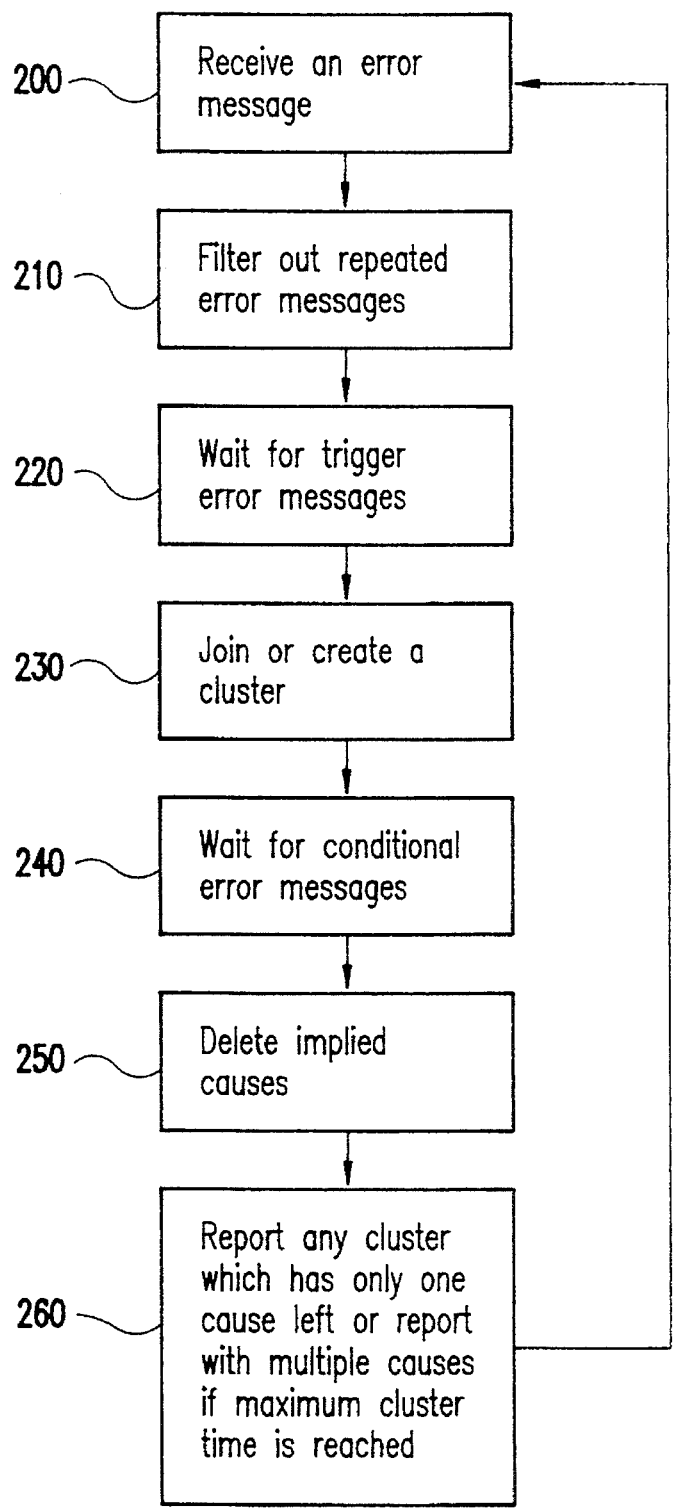
FIG. 4 is a flow diagram showing the method of analyzing and correlating error events using the casual model.

As discussed previously, the causal model defines how knowledge about LAN problem determination is expressed and stored in a knowledge base. The causal model also defines how knowledge is used by an inference engine to perform event correlation and problem determination in real time. FIG. 4 provides a flow diagram of a method wherein the causal model is used by an inference engine for problem determination.

As shown in FIG. 4, first, the inference engine receives error events in the order in which the errors arrive 200. For each error event, the knowledge base is called to identify the error message. If the error message is recognized, information about its possible causes is retrieved and attached to the event.

Then, the incoming error message is compared with other already received events to filter out repeated error messages 210. The error message is deleted if it is the same and is received within a certain period of time after the receipt of the prior message. Two error messages are the same if they have the same error message identification and the same insertion variables. However, the error messages can come from different machines. The period of time is user configurable.

The error message is then analyzed to determine if the message is triggered, or set off by another message 220. The knowledge base contains information as to whether an error message has any triggering error messages. This relationship is defined as described above. If the new error message has a triggering error message, then the inference engine examines the already received error message to determine whether the triggering message has arrived or not. If the triggering message has arrived, then the new error message will be disregarded; otherwise, the inference engine will wait a determinable period of time until an error message processed as a normal error message is processed.

At this point, the incoming error message is compared with existing diagnostic problems, termed a cluster, to determine if the error message shares common causes with all of the error messages in the cluster 230. The data in the knowledge base defines the related causes of the new error message. If there are common causes between an incoming message and any causes of an existing cluster, then the new message will join the existing cluster, and if not, a new cluster will be created for a new diagnostic problem. A more detailed description of the cluster structure is provided infra.

In addition to determining how to cluster an error message, the engine determines whether an error message/cause pair bears a condition 240. The data in the knowledge base defines when a cause is related to an error message and whether a condition is attached to the cause. If so, then the processing is suspended for a user configurable amount of time before the condition is evaluated. Next, the causes in a cluster are evaluated to determine whether one cause in a cluster implies another cause 250. The imply relationship is defined in the knowledge base and is described supra. If one cause in a cause set of a cluster is implied by another cause in the cause set, then the implied cause is discarded. Finally, if the cluster has one fully instantiated cause left, then a problem report will be generated and will provide information regarding all of the messages correlated in the cluster, the cause and the recommended action for fixing the cause 260. The control is then returned to the receiving step.

The inference engine also reviews the status of the clusters. A cluster will be maintained for a user configurable period of time, termed the problem_life_time. At the expiration of the problem_life_time, the cluster is discarded from memory. In addition, there is a maximum time which can be set for the reporting of a problem. After the cluster_max_time, if there is still more than one cause left in the cluster, a problem report will be generated with multiple causes. It should be noted that an error event can join a cluster after a problem report has been generated; however, it must be prior to the expiration of the problem_life_time. The new event provides additional information for the reported problem. Another problem report, the late_problem_report, will be generated which includes the new error message information. The late_problem_report will have the same problem identification number as the original problem report.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A real-time method for correlating causes and error messages to be used in a system for managing error events in a local area network (LAN), said method comprising the steps of:

providing in a knowledge base data defining a plurality of causal relationships, wherein each one of said plurality of said causal relationships associates an error message with at least one cause;

providing in said knowledge base data defining at least one implied relationship, wherein said implied relationship represents a first cause which implies a second cause;

providing in said knowledge base data defining at least one trigger relationship, wherein said trigger relationship associates a first error message with a second error message if said first error message and said second error message are associated with the same causes and said first error message might be produced by the same part of said LAN as said second error message;

receiving error messages from the LAN;

in response to a received error message from said LAN, accessing said knowledge base by an inference engine to identify the error message and retrieve from the knowledge base its possible causes, said inference engine attaching any retrieved possible causes to the received error message;

comparing by the inference engine the received error message with other already received error messages to filter out repeated error messages;

accessing said knowledge base by the inference engine information as to whether the received error message has any triggering error messages and, if so, examining by the inference engine already received error messages to determine whether a triggering error message has arrived and, if so, disregarding by the inference engine the received error message;

accessing said knowledge base by the inference engine for related causes of the received error message and comparing by the inference engine the received error message with existing diagnostic problems, termed a cluster, to determine if the received error message shares common causes with all error messages in the cluster and, if so, adding the received error message to the cluster;

accessing said knowledge base by the inference engine for an imply relationship for the received error message and evaluating by the inference engine the causes in a cluster to determine whether one cause in a cluster implies another cause and, if so, discarding the implied cause; and when a cluster has one fully instantiated cause left, reporting by the inference engine problems including correlated error messages, a cause and a recommended action for fixing the cause.

2. A method as recited in claim 1 wherein each of said causes in said plurality of causal relationships are associated with a place which identifies a location of the cause.

3. A method as recited in claim 1 wherein each of said plurality of causal relationships is associated with a condition wherein said causal relationship is valid only if said condition is satisfied.

4. A method as recited in claim 1 wherein a trigger relationship between first and second error messages includes a user definable time period during which said first error message and said second error message must both be received.

5. A method as recited in claim 1 wherein if the received error message does not share common causes with causes in an existing cluster, creating by the inference engine a new cluster for a new diagnostic problem.

6. A method as recited in claim 1 wherein the step of reporting occurs after a predetermined time has elapsed even if more than one instantiated cause remains in the cluster, and when the step of reporting occurs with more than one instantiated cause remaining in the cluster, a problem report is generated with multiple causes.

7. A method as recited in claim 1 wherein said causes and said error messages include variables wherein for an error message to be associated with a cause said variables of said causes and said error messages must be similarly instantiated.

8. A method as recited in claim 7 wherein the step of comparing the received error message with other already received error messages to filter out repeated error messages includes the step of deleting the received error message if it is the same as a prior error message and it is received within a certain predetermined period of time after the receipt of the prior error message, two error messages being the same if they have the same error message identification and variables even though the two error messages come from different machines.

9. An expert based system for managing error events in a local area network (LAN) in real-time comprising:

at least one LAN server connected in said local area network;

a plurality of LAN requesters connected in said local area network;

a plurality of LAN EXPERT agents installed on LAN servers and LAN requesters to transmit error messages generated by the LAN servers and LAN requesters to a LAN EXPERT server, said LAN EXPERT server being connected in said local area network and including an inference engine, a knowledge base storing data defining a plurality of causal relationships, wherein each one of said plurality of causal relationships associates an error message with at least one cause, at least one implied relationship, wherein said implied relationship represents a first cause which implies a second cause, and at least one trigger relationship, wherein said trigger relationship associates a first error message with a second error message if said first error message and said second error message are associated with the same causes and said first error message might be produced by the same part of said LAN as said second error message, said inference engine accessing said knowledge base in response to a received error message to identify the error message and retrieve from the knowledge base its possible causes, comparing the received error message with other already received error messages to filter out repeated error messages, examining already received error messages to determine whether a triggering error message has arrived and, if so, disregarding by the inference engine the received error message, comparing the received error message with existing diagnostic problems, termed a cluster, to determine if the received error message shares common causes with all error messages in the cluster and, if so, adding the received error message to the cluster, and evaluating the causes in a cluster to determine whether one cause in a cluster implies another cause and, if so, discarding the implied cause, and a user interface connected to said inference engine for reporting problems including correlated error messages, a cause and a recommended action for fixing the cause.

10. A system as recited in claim 9 wherein each of said causes in said plurality of causal relationships are associated with a place which identifies a location of the cause.

11. A system as recited in claim 9 wherein each of said plurality of causal relationships is associated with a condition wherein said causal relationships is valid only if said condition is satisfied.

12. A system as recited in claim 9 wherein said trigger relationship includes a user definable time period during which said first error message and said second error message must both be received.

13. A system as recited in claim 9 wherein said causes and said error messages include variables wherein for an error message to be associated with a cause said variables of said causes and said error messages must be similarly instantiated.

* * * * *

UNITED STATES PATENT AND TRADEMARK OFFICE
CERTIFICATE OF CORRECTION

PATENT NO. : 5,483,637
DATED : January 9, 1996
INVENTOR(S) : Alex Winokur, Joseph Shiloach, Amnon Ribak, Yuangeng Huang It is certified that error appears in the above-indentified patent and that said Letters Patent is hereby corrected as shown below:

ON THE TITLE PAGE:

Item [75], Inventors name should read --Yuangeng--.

Signed and Sealed this

Ninth Day of July, 1996

Attest:

BRUCE LEHMAN

Attesting Officer

Commissioner of Patents and Trademarks